United States Patent [19]

Steinke

[11] Patent Number: 4,988,115

[45] Date of Patent: Jan. 29, 1991

[54] UNDERCARRIAGES

[76] Inventor: Charles W. Steinke, R.R. 2, Box 194, Fairfax, Minn. 55332

[21] Appl. No.: 386,910

[22] Filed: Jul. 31, 1989

[51] Int. Cl.⁵ ............................................. B62D 13/02
[52] U.S. Cl. .................... 280/404; 280/442; 280/781; 280/114
[58] Field of Search ...................... 280/400, 404, 405.1, 280/414.5, 426, 442, 425.2, 441.2, 491.3, 491.1, 114, 781, 109, 115, 127, 128, 407, 407.1; 403/79, 149, 157, 161, 164

[56] References Cited

U.S. PATENT DOCUMENTS

| | | | |
|---|---|---|---|
| 2,450,204 | 9/1948 | Pridy | 280/404 X |
| 2,466,194 | 4/1949 | Anderson et al. | 280/115 |
| 2,653,838 | 9/1953 | Danly et al. | 403/157 |
| 2,758,849 | 8/1956 | Compton | 280/677 |
| 4,262,920 | 4/1981 | Mettetal | 280/408 |
| 4,405,147 | 9/1983 | Horsman et al. | 280/442 X |
| 4,854,407 | 8/1989 | Wagner | 280/407 X |

FOREIGN PATENT DOCUMENTS

| | | | |
|---|---|---|---|
| 1357747 | 12/1987 | U.S.S.R. | 280/400 |
| 2126966 | 4/1984 | United Kingdom | 280/407.1 |

Primary Examiner—Charles A. Marmor
Assistant Examiner—Mitchell Bompey
Attorney, Agent, or Firm—Jacobson & Johnson

[57] ABSTRACT

An undercarriage for pivotable supporting the front end of a trailer with the undercarriage including a set of bolsters that provide a pivoting and rockable connection between a box on the trailer and the front undercarriage to reduce stress on the box with the undercarriage including detachable lift members to permit the user to raise the rear wheels of the undercarriage to permit one to back the trailer like a conventional trailer.

11 Claims, 4 Drawing Sheets

UNDERCARRIAGES

FIELD OF THE INVENTION

This invention relates generally to trailers and, more specifically, to front undercarriages or running gears for trailers to be towed behind farm tractors or the like.

BACKGROUND OF THE INVENTION

The concept of trailers for towing behind farm tractors or the like is well known in the art. Typically, trailers have either a single axle or a dual axle. The single axle trailers generally have a pole that distributes a portion of the weight of the trailer to the tractor hitch. In contrast the dual axle trailers usually have a front undercarriage and a rear undercarriage that support the entire weight of the trailer. The dual axle trailers usually have a nonsteerable rear axle and a steerable front axle that includes a pole that both pulls the trailer and steers the front wheels through tie rods connected to the pole and the front wheels.

The present invention is directed toward an improved dual axle trailer undercarriage that utilizes a set of bolsters in the front carriage to provide both pivotal and steering gear support for the front end of a dual axle trailer or the like. The utilization of the present invention permits the front undercarriage to follow the contour of the terrain without undue stressing or bending the container or box located on the trailer. The invention also permits sharp turns and provides for easy turning of the tongue to make hookup easier. The additional tires also provide greater flotation.

DESCRIPTION OF THE PRIOR ART

The U.S. Pat. No. 4,262,920 shows a trailer for a truck that utilizes a front swiveling carriage and a rear non swiveling carriage.

The U.S. Pat. No. 2,758,849 shows an articulating tandem that utilizes universal joint connections to permit the front and rear wheels of the undercarriage to turn.

The U.S. Pat. No. 4,379,571 shows a trailer with adjustable wheels.

The 1986 Brochure of Parker Industries No. 76-9867 shows a typical wagon running gear that is used to support and trailer a load behind a farm tractor.

SUMMARY OF THE INVENTION

Briefly, the present invention comprises a trailer with a wheeled front undercarriage support that permits easy steering of the front undercarriage yet also allows the front undercarriage to follow uneven terrain without stressing the box on the trailer and a detachable member permitting the user to disengage the rear wheels of the front undercarriage to permit the user to back the trailer like a conventional trailer.

DESCRIPTION OF THE PREFERRED EMBODIMENT

Figure 1:
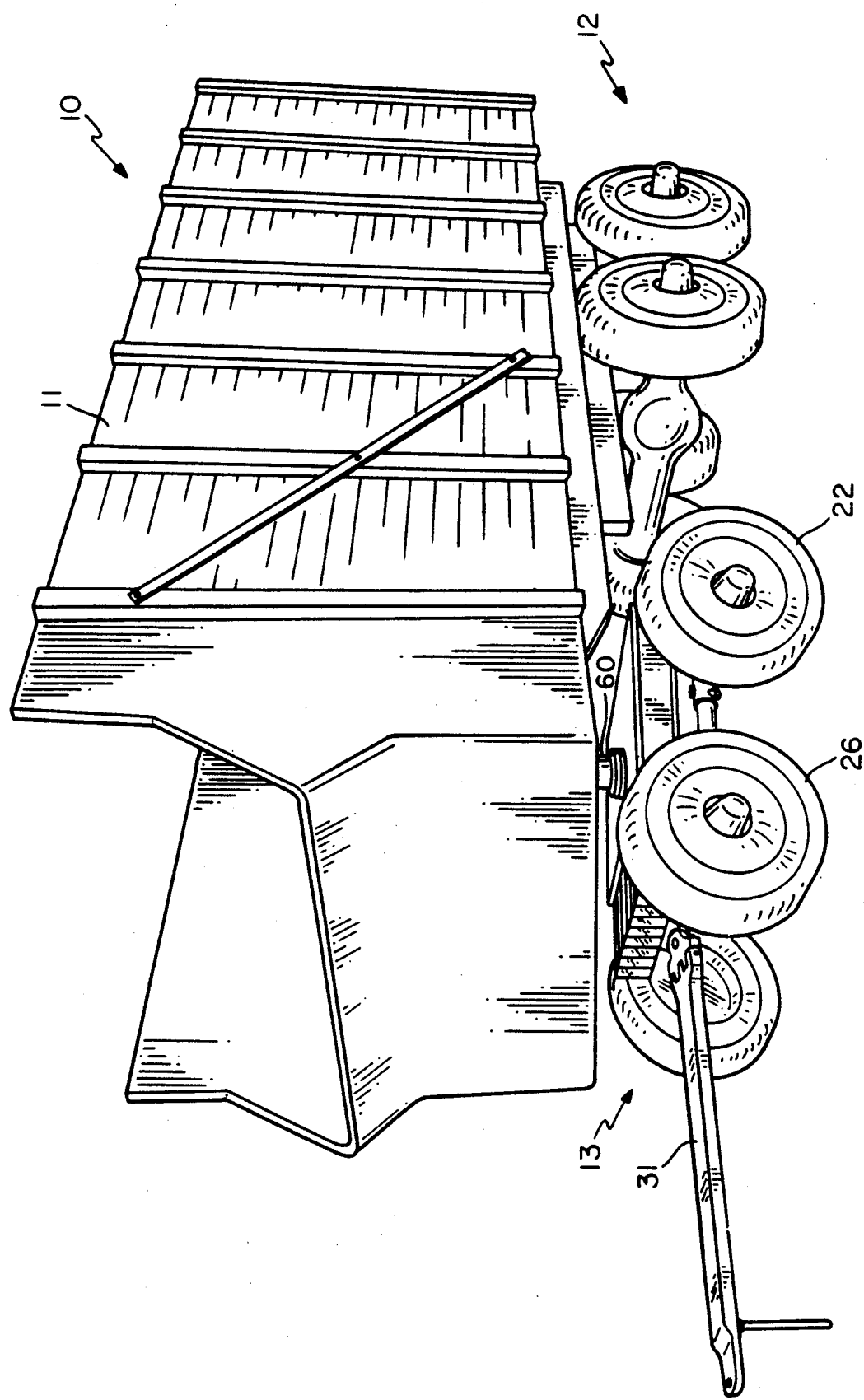
FIG. 1 shows a perspective view of my front undercarriage for a field wagon.

Referring to FIG. 1 reference numeral 10 generally identifies a trailer comprising a farm wagon having a box 11, a rear undercarriage 12 and the front undercarriage 13 of the present invention. Front undercarriage 13 includes a steering and pulling pole 31 to permit wagon 10 to be towed behind a farm tractor. A pivot column 60 pivotable connects the front end of box 11 to front undercarriage 13.

Figure 4:
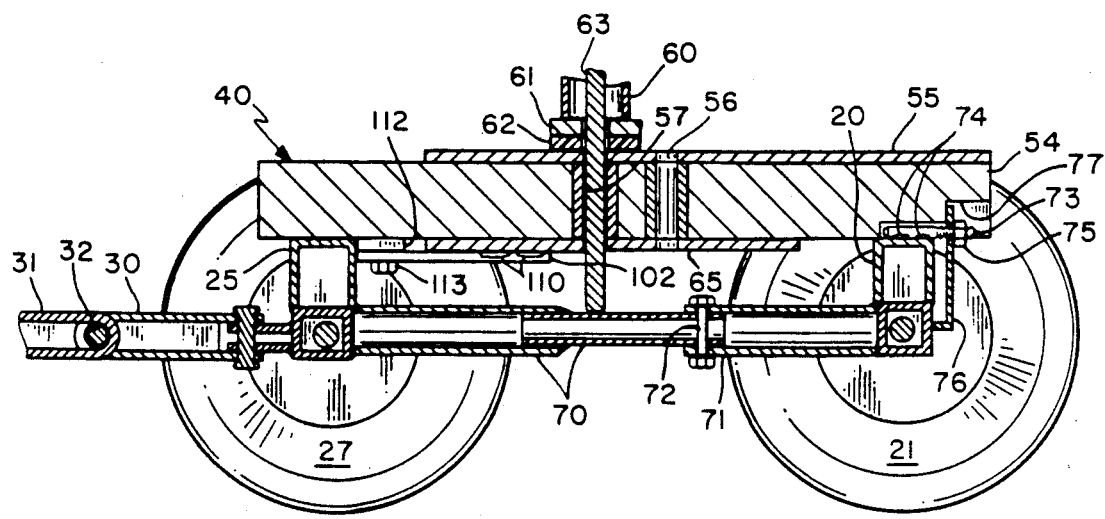
FIG. 4 shows a sectional view taken along lines 4—4 of FIG. 3.

FIG. 4 shows a side view of my undercarriage of the present invention comprising a set of bolsters for supporting the box. The bolsters include a horizontal extending platform like bolster 40 that rests on a front elongated bolster 25 located over the front axle of undercarriage 13 and a rear bolster 20 located above the rear axle of the front undercarriage 13.

Figure 3:
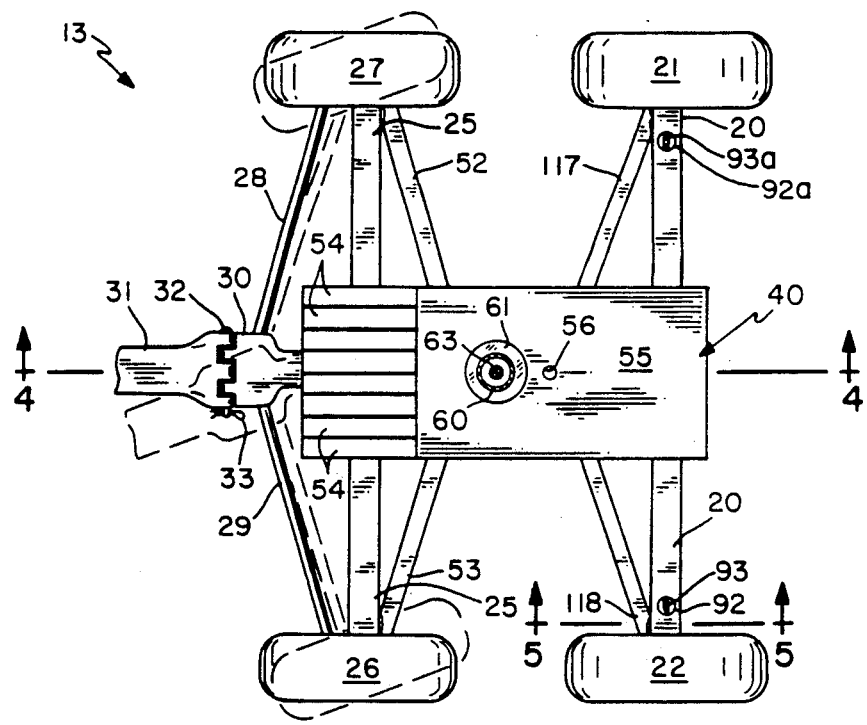
FIG. 3 shows a top view taken along lines 3—3 of FIG. 2.

Referring to FIGS. 3 and 4 the platform like bolster 40 comprise a plurality of 2" by 6" boards 54 that are fastened to each other in a side by side relationship to from a solid platform like platform bolster for pivotable supporting the front end of a wagon. Located on top of bolster 40 and extending partially over the top surface of bolster 40 is a top metal plate 55 and located below bolster 40 and extending partially over the bottom surface of bolsters 40 is a similar bottom metal plate 65. Plates 55 and 65 are fastened to members 40 with fasteners such as lag bolts or the like (not shown). Plates 55 and 65 help tie members 54 into a single solid platform.

Extending through platform bolster 40 is a front collared opening 57 and a rearward collared opening 56. Either front collared opening 56 or rear collared opening 56 can be used to attach a wagon box to undercarriage 13. The use of two different collared openings permits a user to position the load from the front of the wagon box on either of two different locations so that the user can obtain the optimal weight transfer location. In the preferred embodiment I place the opening 57 so that about 45% of the weight on the platform is on the front wheels and the balance is on the rear wheels that support the platform. In order to pivotable and rockable connect wagon box 11 to front undercarriage 13 I provide a hollow metal post 60 that terminates in a flange 61 that is welded on the end of post 60. In operation flange 61 pivotable engages a circular bolster washer 62 that provides low friction pivotable support between flange 61 and platform bolster 40.

A pin 63 extends loosely through a central opening in flange 61 and opening 57 to provide a 360 degree pivotable connection between wagon box 11 and front undercarriage 13 to permit the box to remain straight while the undercarriage moves up and down to follow the rough terrain. The use of the single pin pivotable connection with the undercarriage provides for 10 to 20 times less twisting of the box than with conventional units where the box sits directly on a front wheel support. Pin 62 is held in vertical position by tubular member 70. The use of the tubular member 70 as a support permits one to remove pin 63 from below to disconnect or relocated the post 60 by disconnecting tubular member 70. By providing a pin 63 that is slightly longer and with a diameter slightly smaller than opening 57 I permit platform bolster 40 to pivot downward or rock sideways without providing a corresponding twisting force to wagon box 11. That is, if rear wheels 21 and 22 should fall in a dead furrow the pin 63 has sufficient clearance to provide a pivotable connection that permits independent rocking motion of bolster 40 with respect to box 11. The use of a longer pin permits the user to either reverse pin 63 as wear occurs or to cut off a portion of the pin so the wear area can be distributed over different portions of the pin.

Figures 6, 7:
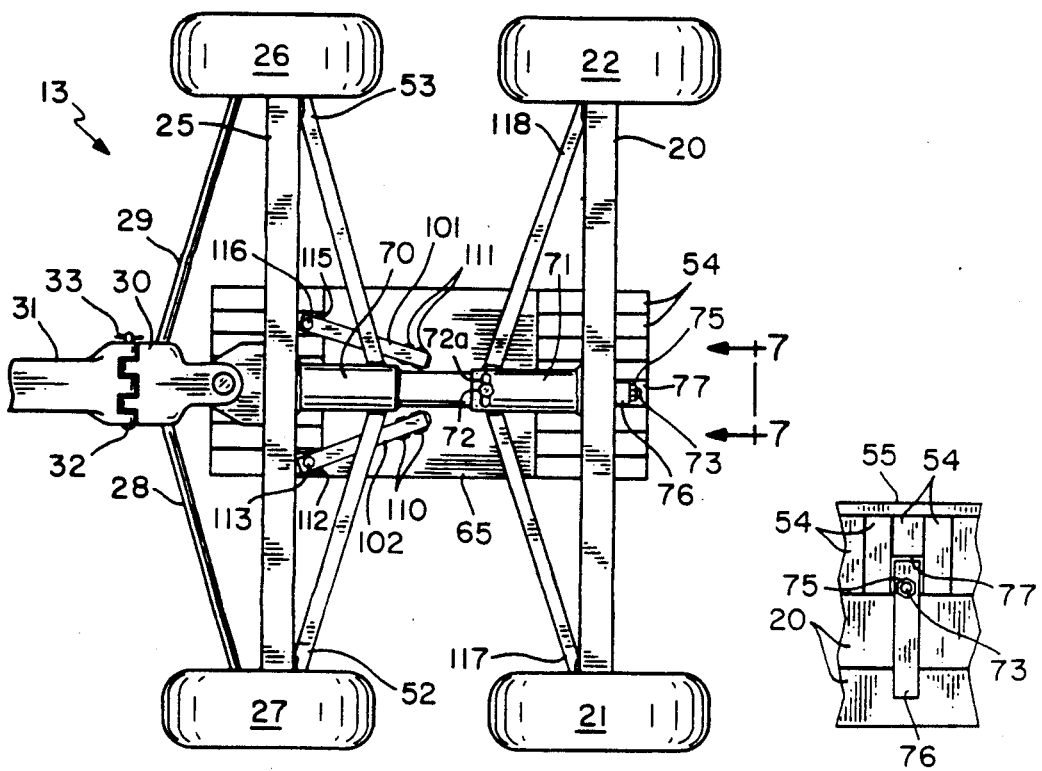
FIG. 6 shows a bottom view of my undercarriage.
FIG. 7 shows an end view of my rear platform holder.

In order to more fully appreciate the other features of my front undercarriage reference should be made to FIGS. 3, 4, and 6 which show front undercarriage 13 in top view, side section view, and bottom view. Located below platform bolster 40 is a portion of a conventional wagon running gear having a rear axle with a rear wheel 21 and a rear wheel 22. A brace 118 connects one end of bolster 20 to a horizontal extending tubular center member 71 and a similar brace 117 connects the opposite end of bolster 20 to tubular center member 71. Rotatable connected to member 71 is a similar tubular member 70 that extends into tubular member 71. An elongated slot 72a located on the bottom of tubular member 71 and a similar elongated slot (not shown) located on the top of tubular member couped with a bolt 72 that extends through member 70 provides a rotational connection between member 70 and member 71. The rotational connection therebetween permits the rear axle with rear wheels 21 and 22 to move laterally up and down independent of the lateral up and down movement of the wheels 26 and 27 on the front axle of undercarriage 13. While the running gear portion is conventional the prior art has placed the wagon box directly on top of the front and rear bolsters of the running gear. In contrast with my invention the running gear is fitted with a platform bolster 40 that pivotable and rockable supports the box.

The front axle of the undercarriage includes a front bolster 25 that supports one end of top platform bolster 40. To provide a front support structure for the running gear a front brace 53 connects member 70 to one end of bolster 25 and a similar front brace 52 connects member 70 to the other end of bolster 25. The braces coact to provide a front frame support for the front axle of undercarriage 13. In order to provide a steering control of my front carriage the front wheels 27 and 26 are steerable through a first tie rod 29 and a second tie rod 28 that connects to a vertically pivoting tongue 31 through a piano like hinge 30. A pivot pin 32 extends through piano like hinge 30 to permit pole 31 to pivot up or down about pin 32. The piano like hinge 30 permits the pole to proved a lateral turning force on tie rods 29 and 28 so front wheels 26 and 27 can be turned. FIG. 3 illustrates in phantom that when the pole 31 is turned the front wheels 26 and 27 are turned while the rear wheels 21 and 22 remain pointed straight ahead. An advantage of the use of a front undercarriage with pivotable front wheels is that it is easier for a person to move pole 31 into alignment for attaching to a tractor.

In order to provide an additional pivotable connection between box 11 and front undercarriage 13 I provide for vertical motion of platform bolster 40 with respect to front bolster 25 and rear bolster 20. FIG. 4 shows that platform bolster 40 is vertically supported on top of front bolster 25 and on top of rear bolster 20. In order to prevent rearward or forward displacement of platform bolster 40 on front bolster 25 I provide triangularly located flexible connectors 101 and 102.

(FIG. 6) In order to prevent rearward or lateral displacement of platform 40 on rear bolster 20 I provide a bolt and recess arrangement. FIG. 4 shows a bolt 73 that is fastened to rear bolster 20 through welds 74. One end of bolt 73 includes a nut 74 that holds an L-Shaped bracket 76 against rear axle housing and the platform 40. FIG. 4 and FIG. 7 show that the combination of the recess in the platform and the bolt extending up into the recess prevents lateral displacement of the platform on the rear bolster 20. Similarly, the location of the L-shaped bracket prevents the platform from sliding rearward on rear bolster 20. Accordingly, platform bolster 40 is restrained from lateral, forward or rearward displacement with respect to the front bolster 25 and the rear bolster 20 but it is not restrained from flexing vertical displacement with respect to the front and rear bolsters. Consequently, platform 40 can flex with respect to an individual bolster as the undercarriage passes over rough terrain.

If the front wheels are vertically displaced by uneven terrain platform bolster 40 while restrained from horizontal displacement is permitted to move slightly vertically with respect to front bolster 25 and rear bolster 20. In order to provide for restrained vertical flexing of platform bolster 40 with respect to bottom bolster 25 I provide flexible connections from bottom plate 65 to front bolster 25. FIG. 6 shows a first flexible connector 101 that is fixedly connected on one end to plate 65 with a weld 111 and pivotable connected on the opposite end to bolster 25 through a pivot pin 116 that extends through an opening in bolster flange 115. Similarly, a flexible connector 102 has one end connected to bottom plate 65 through a weld 110 and the other end connected to a bolster flange 112 on bolster 25 through a pivot pin 113. Flexible connectors 102 and 101 are made from strap metal or the like and are of sufficient thinness that they readily flex as platform bolster 40 may move with respect to front bolster 25. Typically, the size of the flexible connection depends on the size of the load. With heavier loads a stiffer connection is preferred while with lighter loads a more flexible connection can be used. While flexible connectors permit flexing of bolster 40 with respect to bolster 25 they also restrain bolster 40 from excessive vertical displacement to prevent the bolster 40 from moving vertically upward over the ends of stakes 50 or 51. The combination of the flexibility of platform bolster 40 with respect to the front bolster 25 and rear bolster 20 and the pivotable connection of box 11 to platform bolster 40 with a loosely fitting pivot pin permits front undercarriage to independently follow the terrain without requiring box 11 to follow the oscillating motion of the front undercarriage as it passes over uneven terrain.

Figure 2:
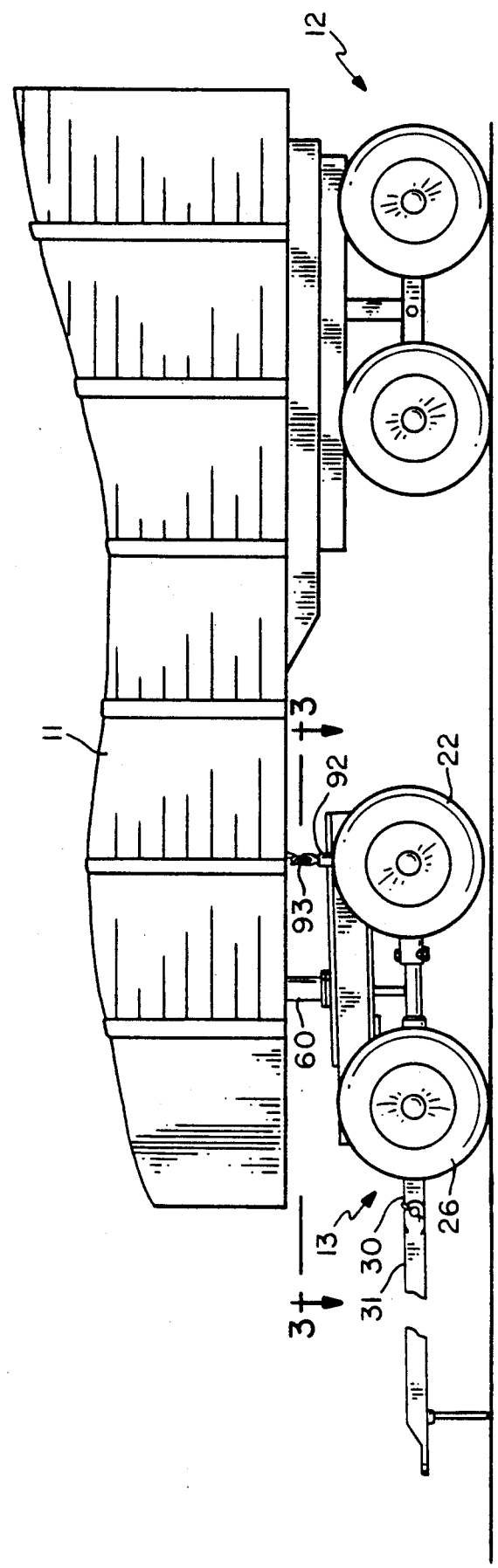
FIG. 2 shows a partial side view of the invention of FIG. 1.
Figure 5:
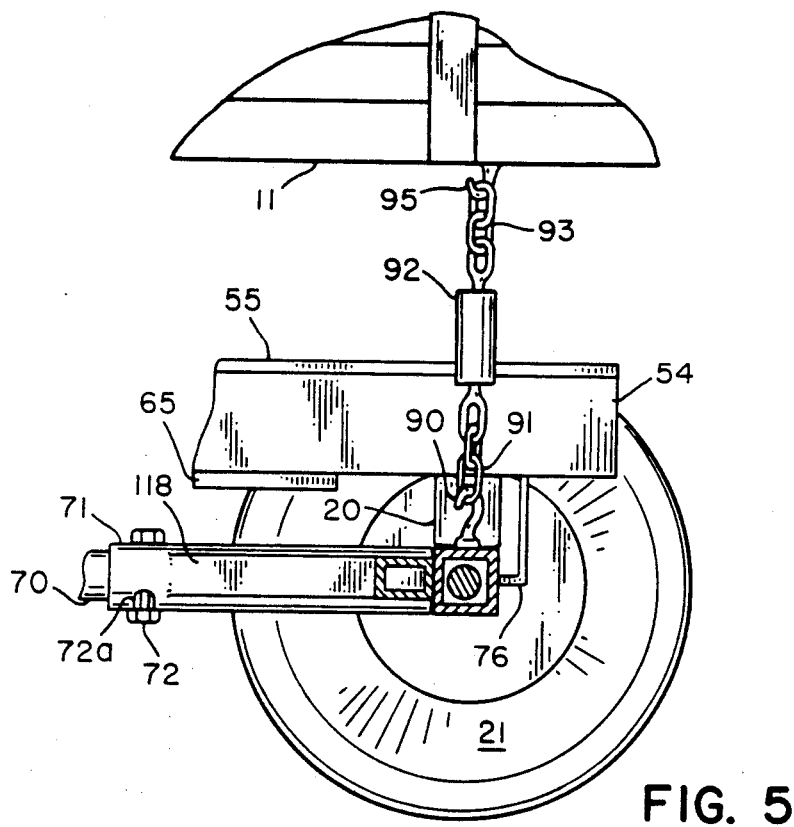
FIG. 5 shows a partial sectional elevation view taken along lines 5—5 of FIG. 3.

One other feature of my invention is the use of lift links that can be connected to rear bolster 20 and the bottom of the wagon box to permit front wheels 26 and 27 to provide the sole steering. FIG. 5 shows a lift member 92 having one end with links 93 connected to a hook 95 located on the underside of box 11. The other end of lift member 92 has links 91 that connect to a hook 90 located on bolster 20. Lift member 92 may be a hydraulic contracting member or the like that contracts to pull the rear axle of undercarriage 13 off the ground as shown in FIG. 2. An identical lift member located on the opposite side of undercarriage 13 permits the other end of bolster 20 to be connected to the underside of box 11. THe use of the two lift members and the pivoting connection between box 11 and platform bolster 40 enables a user to effectively disengage the rear wheels 22 and 21 of the undercarriage so that only the front wheels 26 and 27 are engagement with the terrain thereby making it easier to back the wagon into a small area.

I claim:

1. A trailer for towing by a vehicle comprising:
a rear wheeled undercarriage for supporting a rear of the trailer;
a front wheeled undercarriage for pivotably and rockably supporting a box on the trailer, said front undercarriage including a platform bolster, said platform bolster pivotally connected to the box on the trailer, a set of front wheels on said front undercarriage, a set of rear wheels on said front undercarriage, said front wheels having a front bolster extending therebetween to vertically support said platform bolster, said rear wheels having a rear bolster extending therebetween to vertically support said platform bolster, and tie rods connected to said front wheels to permit a user to turn the front wheels of said front undercarriage independent of the rear wheels of said front undercarriage so that the front undercarriage provides steerable pivotal support to the box on the trailer to thereby minimize the stress on the box induced by the undercarriage passing over uneven terrain; and
said platform bolster includes a recess and said rear bolster includes a member attached to said rear bolster and positioned in said recess to prevent lateral displacement of said platform bolster with respect to said rear bolster.

2. The trailer of claim 1 including flexible connectors connected to said platform bolster and to the front bolster to permit the platform bolster to flex with respect to said front bolster.

3. The trailer of claim 1 including lift members to suspend the rear wheels of said front undercarriage off the ground to permit easier backing of the trailer.

4. The trailer of claim 1 wherein said platform bolster includes a collared opening for forming a pivotable connection with the box on the trailer.

5. The trailer of claim 1 wherein said trailer includes a tongue and tie rods to permit steering of the front wheels of the front undercarriage independent of the rear wheels of the front undercarriage.

6. The trailer of claim 1 wherein said platform bolster comprises sandwiched layers of wood having a top support plate and a bottom support plate attached thereto.

7. The trailer of claim 1 including a tongue connected to said front undercarriage, said tongue connected to said front undercarriage with a piano like hinge to thereby provide a pivotable connecting link between said trailer and a towing vehicle.

8. The trailer of claim 1 wherein said platform bolster includes a pivot pin to attach said undercarriage to said trailer with at least two openings for a pivot pin to permit the user to position the front end of said trailer box with respect to said front undercarriage with at least one of said openings permitting approximately 45% of the weight on the undercarriage to be on said front bolsters.

9. The trailer of claim 1 wherein said platform bolster includes bottom stops to prevent rearward or forward motion of said platform bolster with respect to said front undercarriage.

10. A trailer for towing by a vehicle comprising:
a rear wheeled undercarriage for supporting the rear of the trailer;
a front wheeled undercarriage for pivotable and rockable supporting a box on the trailer, said front undercarriage including a platform bolster, said platform bolster pivotally connected to the box on the trailer, a set of front wheels on said front undercarriage, a set of rear wheels on said front undercarriage, said front wheels having a front bolster extending therebetween to vertically support said platform bolster, said rear wheels having a rear bolster extending therebetween to vertically support said platform bolster, and tie rods connected to said front wheels to permit a user to turn the front wheels of said front undercarriage independent of the rear wheels of said front undercarriage so that said front undercarriage provides steerable pivotal support to the box on the trailer to thereby minimize the stress on the box induced by the undercarriage passing over uneven terrain; and
a single loose fitting pivot pin connecting said box to said platform bolster to provide a pivotable rockable connection between the box and said platform bolster wherein said pivot pin can be repositioned as said pivot pin wears.

11. The trailer of claim 10 wherein said front wheels of said front undercarriage are vertically displaceable with respect to said rear wheels of said front undercarriage to permit said front undercarriage to go over uneven terrain without directly transferring stress to the box located on the trailer.

* * * * *